Jan. 24, 1933. F. WOOD 1,895,142
BEARING FOR ARMATURE SHAFTS OF ELECTRIC MOTORS AND DYNAMOS
Filed Aug. 24, 1931  3 Sheets-Sheet 1

Inventor
Frederick Wood
By
Attorneys

Jan. 24, 1933.  F. WOOD  1,895,142
BEARING FOR ARMATURE SHAFTS OF ELECTRIC MOTORS AND DYNAMOS
Filed Aug. 24, 1931  3 Sheets-Sheet 2

Inventor
Frederick Wood
By
Attorneys

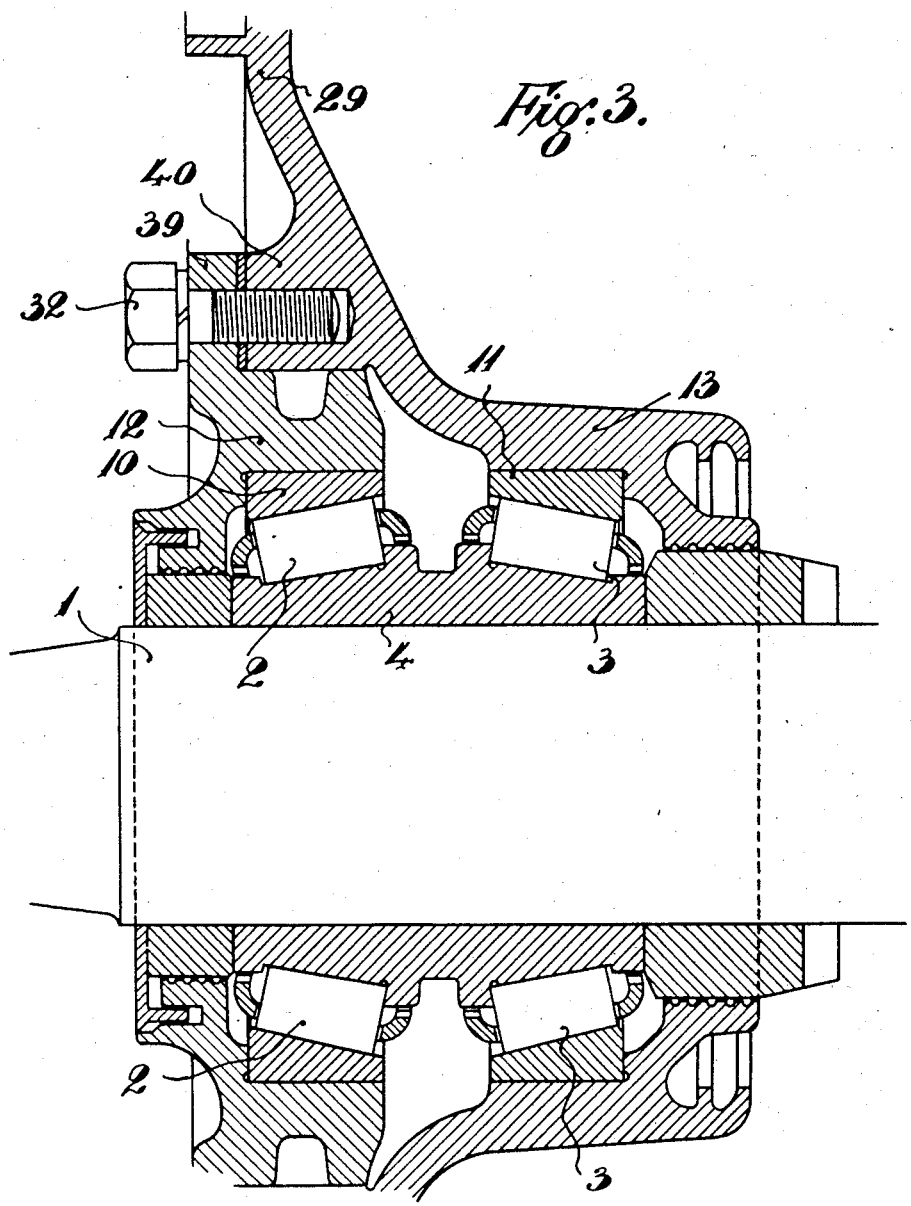

Patented Jan. 24, 1933

1,895,142

UNITED STATES PATENT OFFICE

FREDERICK WOOD, OF ASTON, BIRMINGHAM, ENGLAND, ASSIGNOR TO THE TIMKEN ROLLER BEARING COMPANY, OF CANTON, OHIO, A CORPORATION OF OHIO

BEARING FOR ARMATURE SHAFTS OF ELECTRIC MOTORS AND DYNAMOS

Application filed August 24, 1931, Serial No. 559,028, and in Great Britain February 7, 1931.

This invention relates to roller or ball bearings for the armature shafts of electric motors and dynamos, in which two sets of rollers or balls are disposed around the shaft between inner and outer races.

The principal object of the invention is to provide a bearing mounting in which the location of the bearing on the shaft relies upon an interference or press fit between the shaft and the bearing that is adequate to resist thrust loads and axial shocks of substantial magnitude without permitting radial or longitudinal displacement of the bearing relative to the shaft, and incorporating a housing of an improved construction with means for enabling the inner race or races to be readily withdrawn when required. A further object is to admit of the removal of the armature shaft complete with bearings and housings leaving the bearings fully enclosed and thus protected from mechanical damage and from foreign matter penetrating into the housings.

According to this invention the bearing is arranged within a two-part housing or casing, the one part of which may be detached when required to expose the bearing and enable a tool to be inserted for the removal of the inner race or races which are a press-fit on the shaft and formed or provided with a recess or groove, or with a projection or shouldered part, with which the tool may be engaged. The two parts of the housing, each of which may be of a substantially cup-formation, are preferably detachably secured together by screws engaging opposed flanges on the two parts, and these flanges may serve detachably to connect the housing to the yoke plate or end plate of the motor or dynamo.

Figure 1 of the accompanying drawings is a longitudinal section through the bearing provided at one end of an armature shaft in accordance with this invention.

Figure 3 is a sectional view showing a modification.

Figure 1:
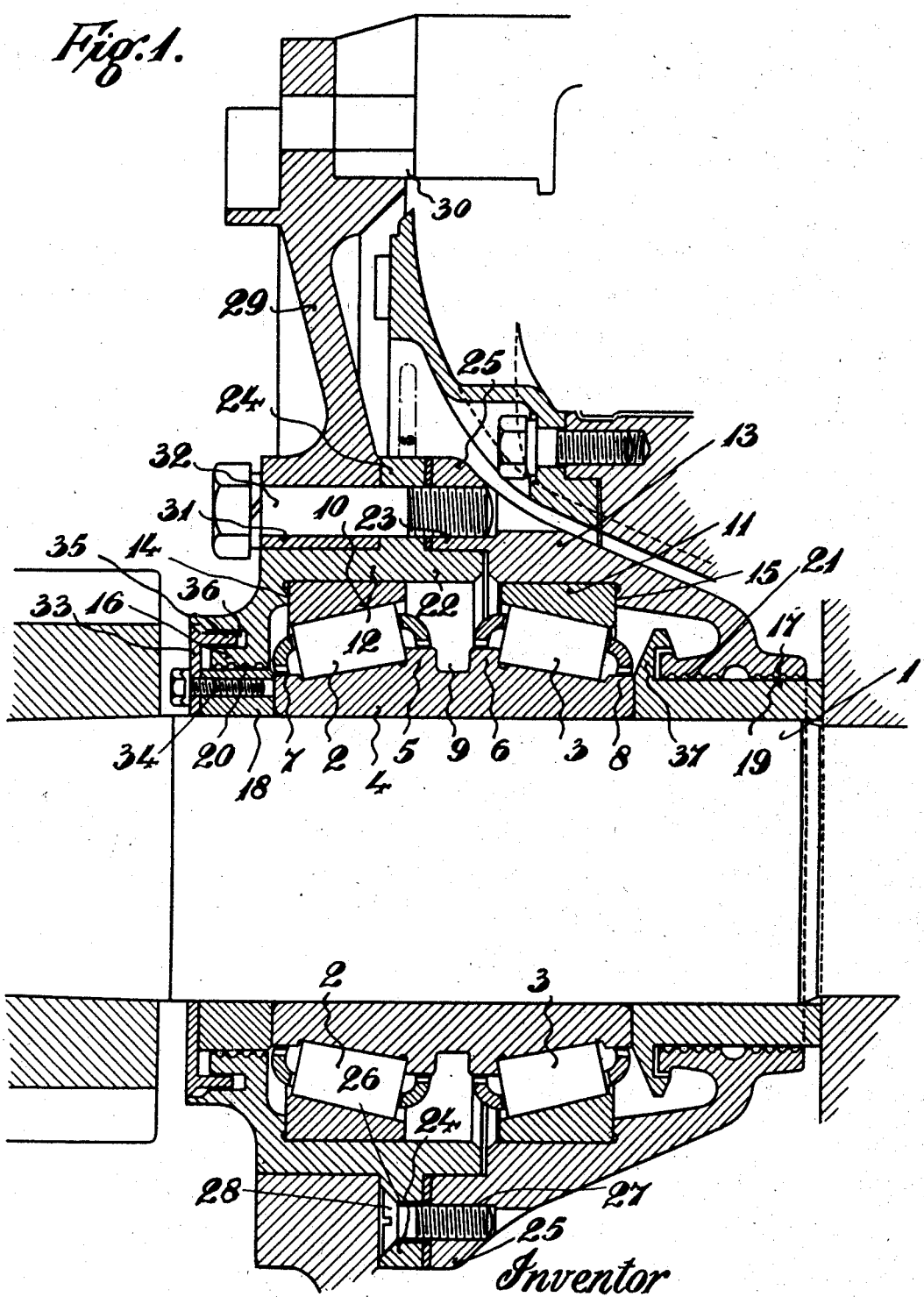
Figure 2:
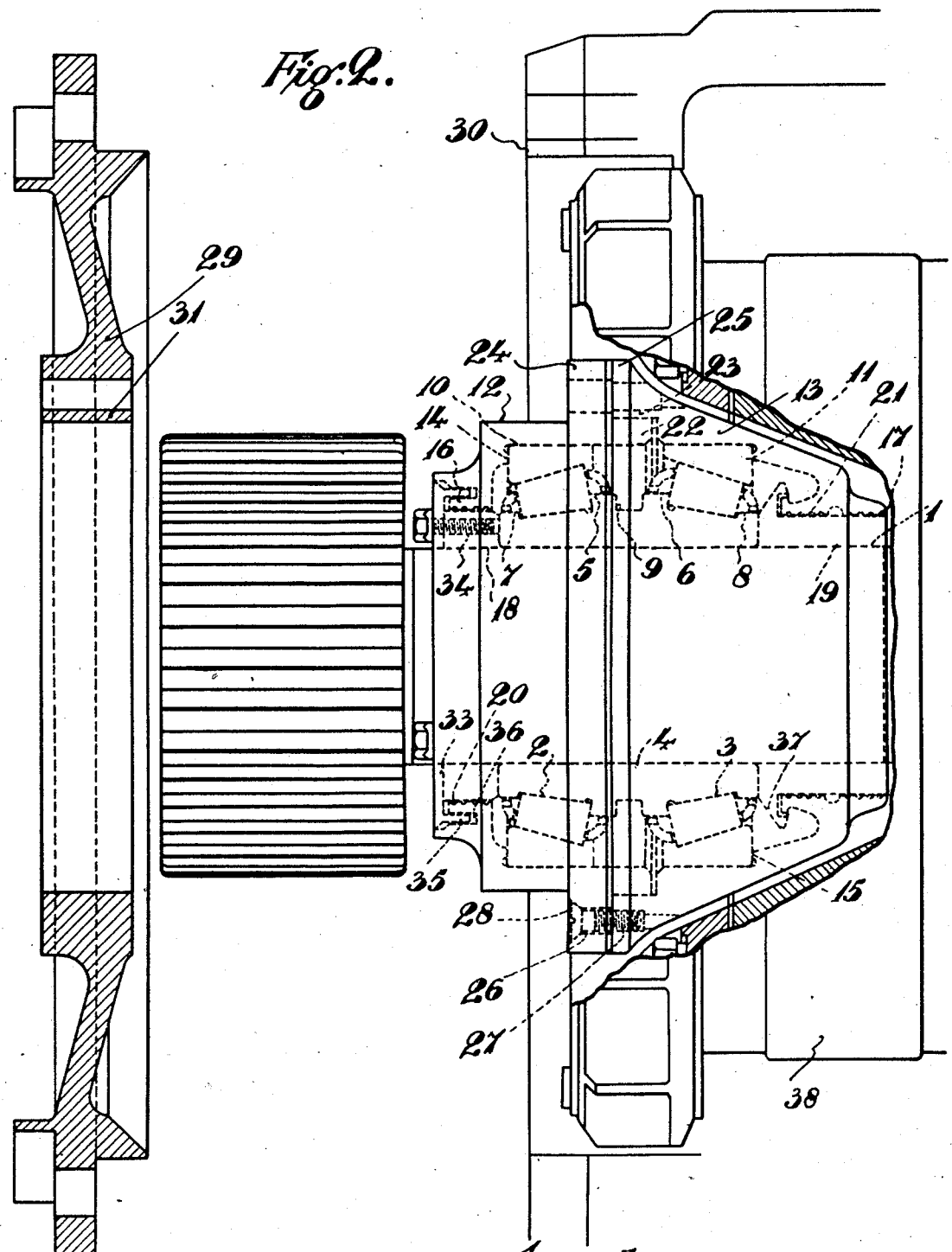
Figure 2 shows the end plate or yoke plate removed and the bearing assembly in elevation, part of the armature being represented as being broken away to show the said bearing assembly.

Referring to Figures 1 and 2, which show the application of the invention to the driving end of the armature shaft of an electric motor, the said end of the armature shaft 1 is supported by two sets of taper rollers 2, 3, the rollers of each set being spaced around the shaft at suitable distances apart between inner and outer races, with the larger ends of the rollers of the two sets opposed to one another. The inner race surfaces of the two sets of rollers are formed on the opposite ends of an open-ended sleeve 4 which is forced or pressed endwise over the armature shaft 1 so as to be a tight fit thereon and turn therewith, the said inner race surfaces, inclining down towards the ends of the sleeve in opposite directions, suitable locating ribs or shouldered parts being provided around the middle of the sleeve as at 5, 6, and around each end of the latter as at 7, 8, the ribs 5, 6, at the middle being separated by an annular groove 9. The outer races or cups 10, 11, for the two sets of rollers are each carried by a separate cup-shaped housing, 12, 13, respectively, the open ends of the two housings being applied together to form an enclosed two-part casing. The outer races 10, 11, are pressed into the respective housings 12, 13, so that their larger ends, that is, the ends which are of smaller bore, engage internal shoulders 14, 15, around the housings; and the outer ends of the two housings are directed in towards the armature shaft and are formed with short integral sleeves or rings 16, 17, which are arranged to fit closely around respective sleeves or rings 18, 19, fixed to the said shaft, so that they may turn relatively thereto, the arrangement being such that when the two housings 12, 13 are fitted together the bearing is completely enclosed. Oil retaining grooves 20, 21, may be formed around the sleeves 16, 17, at the outer ends of the housings, and the opposed inner ends of the two housings 12, 13, are formed with co-operating stepped or shouldered portions 22, 23, adapted to fit together. Around the inner end of each housing is an annular external flange 24, 25, respectively, the two flanges being applied one against the other and being formed with peripherally-spaced co-incident holes 26, 27, adapted to receive screws 28 (see lower part of Figures 1 and 2) for rigidly but detachably securing the two housings together. The two-part casing thus provided is adapted to be rigidly attached to the yoke plate or end plate 29 of the motor. This yoke plate or end plate, which is detachably bolted to the body or casing 30 of the motor, is formed with a large central opening 31 which is adapted to receive the outer housing 12, so that the central part or boss of the yoke plate engages the flange 24, and in order to secure the two-part casing formed by the housings 12, 13, to the yoke plate or end plate 29 the latter and the flanges 24, 25, on the housings are formed with coincident holes to receive attachment bolts 32, the holes in the flanges being disposed between the screw holes 26, 27, formed therein. By means of these bolts 32 the two housings or two-part casing 12, 13 may be securely attached to the yoke plate or end plate 29 of the motor. The sleeve or ring 18 on the armature shaft which is encircled by the end 16 of the outer housing member 12 preferably has an end plate or disc 33 attached thereto by bolts 34 and provided with an annular flange 35 concentric with the armature shaft and engaging an annular groove 36 in the said end 16 of the housing. The sleeve or ring 19 which is engaged by the other housing member 13 has an annular flange 37 around its inner end.

On removing the bolts 32 connecting the two-part housing to the yoke plate or end plate 29 of the motor, the said yoke plate or end plate may be detached, as shown in Figure 2, and the shaft 1 with the armature 38 and bearings may be withdrawn, if required, as a single unit, the bearings and the two-part housing remaining undisturbed.

If desired, the outer part 12 of the housing may be detached from the inner part 13, after the removal of the yoke plate or end plate, the arrangement is such that a claw-extractor or other suitable tool may then be inserted and engaged with the groove 9 around the inner race sleeve 4, so that the said inner race sleeve may thus be readily withdrawn from the shaft. The arrangement thus enables the bearing to be easily inspected.

Instead of the inner race sleeve 4 being formed with an annular groove as described, it may obviously be formed with suitable recesses, or with a projection or shouldered portion, which may be engaged by the withdrawal tool or extractor.

In the modification represented in Figure 3, the yoke or end plate 29 is in one with the inner housing 13, the outer housing 12 being detachably secured to the said yoke or end plate by bolts, studs or the like 32 passing through a flange 39 on the said outer housing, said flange engaging a boss 40 on the yoke plate. The arrangement of the sleeve 4 on shaft 1 and the rollers 2, 3, with their outer races 10, 11, is the same as in Figures 1 and 2.

Instead of taper bearing rollers being employed, the bearing may be of the cylindrical roller type with provision for taking end thrust, or it may be a ball bearing, such as the cup and cone type.

Having fully described my invention, what I desire to claim and secure by Letters Patent is:—

1. In an electric motor, the combination with a body casing of an end cover having a central opening, an armature shaft extending through said opening, an inner bearing pressed on said armature shaft entirely inwardly of the end face of said end cover and having two raceway surfaces, two axially spaced outer bearing cups, spaced sets of antifriction rolling elements between said inner and outer bearing members, an inner housing member extending inwardly from and supported by the end cover and containing and supporting the innermost of said bearing cups, an annular outer housing member surrounding the shaft and having a portion detachably fitting said central opening in said end cover, said outer housing member containing and supporting the outermost of said bearing cups substantially inwardly of the inner surface of said end cover, and means for detachably securing said outer housing member in position.

2. In an electric motor, the combination with a body casing of an end cover having a central opening, an armature shaft extending through said opening, an inner bearing member pressed on said armature shaft entirely inwardly of the end face of said end cover and having a circumferential groove around its middle for engagement by a withdrawal tool, two axially spaced outer bearing cups, spaced sets of antifriction rolling elements between said inner and outer bearing members, an inner housing member extending inwardly from and supported by the end cover and containing and supporting the innermost of said bearing cups, an annular outer housing member surrounding the shaft and having a portion detachably fitting said central opening in said end cover, said outer housing member containing and supporting the outermost of said bearing cups substantially inwardly of the inner surface of said end cover, and means for detachably securing said outer housing member in position.

3. In an electric motor, the combination with a body casing of an end cover having a cylindrical boss with a central opening therein, an armature shaft extending through said opening, said opening being of larger diameter than said shaft, an inner bearing member pressed on said armature shaft entirely inwardly of the end face of said end cover and having two raceway surfaces, two axially spaced outer bearing cups, spaced sets of antifriction rolling elements between said inner and outer bearing members, an inner housing member extending inwardly from and supported by the end cover and containing and supporting the innermost of said bearing cups, an annular outer housing member surrounding the shaft and having a portion detachably fitting said central opening in said end cover, said outer housing member containing and supporting the outermost of said bearing cups substantially inwardly of the inner surface of said end cover, said inner housing member having a circumferential external flange at its large end and said outer housing member having a circumferential external flange abutting thereagainst, and means for securing said flanges together and for securing said end cover to said flanges.

4. In an electric motor, the combination with a body casing of an end cover having a cylindrical boss with a central opening therein, an armature shaft extending through said opening, said opening being of larger diameter than said shaft, an inner bearing member pressed on said armature shaft entirely inwardly of the end face of said end cover and having two raceway surfaces, two axially spaced outer bearing cups, spaced sets of antifriction rolling elements between said inner and outer bearing members, an inner housing member extending inwardly from and supported by the end cover and containing and supporting the innermost of said bearing cups, an annular outer housing member surrounding the shaft and having a portion detachably fitting said central opening in said end cover, said outer housing member containing and supporting the outermost of said bearing cups substantially inwardly of the inner surface of said end cover, said inner housing member having a circumferential external flange at its large end and said outer housing member having a circumferential external flange abutting thereagainst, means for detachably securing said flanges together and bolts detachably connecting said end cover to said flanges.

5. In an electric motor, the combination with a body casing of an end cover having a central opening, an armature shaft extending through said opening, an inner bearing member pressed on said armature shaft entirely inwardly of the end face of said end cover and having two raceway surfaces, two axially spaced outer bearing cups, spaced sets of antifriction rolling elements between said inner and outer bearing members, an inner housing member extending inwardly from and supported by the end cover and containing and supporting the innermost of said bearing cups, an annular outer housing member surrounding the shaft and having a portion detachably fitting said central opening in said end cover, said outer housing member containing and supporting the outermost of said bearing cups substantially inwardly of the inner surface of said end cover, said inner housing member having a circumferential external flange at its outer end and said outer housing member having a circumferential external flange at its inner end abutting thereagainst, said outer housing member having a sleeve portion extending beyond said flange into the bore of said inner housing member, means for detachably securing said flanges together and means for detachably connecting said end cover to said flanges.

6. In an electric motor, the combination with the body casing of an end cover having an inwardly extending housing portion having a cylindrical bearing seat in its inner end portion and an inwardly extending shoulder at the end of said seat, said end cover also having a central opening in its front end of larger diameter than said bearing seat, an inner bearing member pressed upon the armature shaft entirely inwardly of the end face of said end cover, two axially spaced outer bearing cups, of which the innermost is mounted in said bearing seat at the inner end of said housing, a series of antifriction rolling elements between each pair of inner and outer bearing members, an outer annular housing member surrounding the shaft and having an inwardly extending axial sleeve portion detachably fitting in said central opening in said end cover and containing and supporting the outermost of said bearing cups, and means for detachably securing said outer housing member to the end cover.

7. In an electric motor, the combination with the body casing of an end cover having an inwardly extending housing portion having a cylindrical bearing seat in its inner end portion and an inwardly extending shoulder at the end of said seat, said end cover also having a central opening in its front end of larger diameter than said bearing seat, an inner bearing member pressed upon the armature shaft entirely inwardly of the end face of said end cover and having a circumferential groove around its middle portion for engagement by a withdrawal tool, two axially spaced outer bearing cups, of which the innermost is mounted in said bearing seat at the inner end of said housing, a series of antifriction rolling elements between each pair of inner and outer bearing members, an outer annular housing member surrounding the shaft and having an inwardly extending axial sleeve portion detachably fitting in said central opening in said end cover and containing and supporting the outermost of said bearing cups, and means for detachably securing said outer housing member to the end cover.

In testimony whereof I have affixed my signature.

FREDERICK WOOD.